United States Patent
Voss (10) Patent No.: US 11,231,059 B2
(45) Date of Patent: Jan. 25, 2022

(54) FASTENING DEVICE

(71) Applicant: Rock Solid Industries International (Pty) Ltd, Pietermaritzburgh (ZA)

(72) Inventor: Michael Voss, Pinetown (ZA)

(73) Assignee: Rock Solid Industries International (Pty) Ltd, Pietermaritzburgh (ZA)

( * ) Notice: Subject to any disclaimer, the term of this patent is extended or adjusted under 35 U.S.C. 154(b) by 117 days.

(21) Appl. No.: 16/744,596

(22) Filed: Jan. 16, 2020

(65) Prior Publication Data

US 2020/0224690 A1    Jul. 16, 2020

(30) Foreign Application Priority Data

Jan. 16, 2019   (ZA) .................................. 2019/00284

(51) Int. Cl.
*F16B 5/06*    (2006.01)
*F16B 43/00*   (2006.01)
(Continued)

(52) U.S. Cl.
CPC ............ *F16B 5/0642* (2013.01); *F16B 2/065* (2013.01); *F16B 5/0208* (2013.01); *F16B 5/06* (2013.01); *F16B 43/007* (2013.01)

(58) Field of Classification Search
CPC ........ F16B 5/0208; F16B 5/06; F16B 5/0642; F16B 2/065; F16B 2/12; F16B 43/007;
(Continued)

(56) References Cited

U.S. PATENT DOCUMENTS 4,490,083 A * 12/1984 Rebish ............... F16B 5/02
                                            411/338
5,139,361 A *  8/1992 Camuffo ............. F16B 5/02
                                            403/408.1
(Continued)

FOREIGN PATENT DOCUMENTS

DE    202018001757 U1    8/2019

OTHER PUBLICATIONS

"DIRAK-SNAP-Technology—How It Works", [online], retrieved from the Internet Jan. 17, 2020, <https://www.youtube.com/watch?v=pYvOIf7VcqU> (Mar. 14, 2018).
(Continued)

*Primary Examiner* — Matthew R McMahon
(74) *Attorney, Agent, or Firm* — Alston & Bird LLP (57) ABSTRACT

A fastening device for fastening at least two panels or flanges to each other is disclosed. The device comprises a male member, a female member and a washer. The male member is inserted into and at least partially through aligned slots in the panels or flanges. The male member includes or houses a first securing component. The female member defines an opening generally complementally shaped to the projection of the male member. The male member and the female member are configured to receive the at least two panels or flanges between them when the projection is received in the opening. The washer mates with the female member such that displacement of the washer relative to the female member towards the male member is substantially prevented. The device further comprises a second securing component configured to mate with the first securing component and to secure the washer against the female member.

15 Claims, 7 Drawing Sheets

(51) Int. Cl.
*F16B 5/02* (2006.01)
*F16B 2/06* (2006.01)

(58) Field of Classification Search
CPC ...... F16B 19/02; F16B 37/122; F16B 41/002; Y10T 403/7067
See application file for complete search history.

(56) References Cited

U.S. PATENT DOCUMENTS

| | | |
|---|---|---|
| 7,600,794 B2 | 10/2009 | Ramsauer |
| 8,297,169 B2 * | 10/2012 | Kunda .................... F16B 5/025 89/36.11 |
| 9,290,236 B2 * | 3/2016 | Kuwayama .......... B62M 9/1342 |
| 10,266,994 B2 * | 4/2019 | McDowell .............. E01C 5/005 |
| 2004/0227311 A1 * | 11/2004 | Sanders ................ F16B 37/122 280/14.22 |
| 2011/0164942 A1 * | 7/2011 | Sambommatsu ..... F16B 5/0642 411/360 |
| 2017/0073904 A1 * | 3/2017 | McDowell ................ F16B 5/10 |

OTHER PUBLICATIONS

"DIRAK-SNAP Technology", [online], retrieved from the Internet Jan. 17, 2020, <https://www.youtube.com/watch?v=_yTRQ_oWp2o> (Apr. 4, 2017).
"DIRAK-SNAP Technology—DIRAK", [online], retrieved from the Internet Jan. 17, 2020, <https//dirak.com/en/solutions/dst> (undated).

\* cited by examiner

Prior Art

FASTENING DEVICE

FIELD OF THE INVENTION

The invention relates, generally, to fastening devices or fasteners. More specifically, the invention relates to a fastening device for fastening or joining two or more panels, flanges, sheets of material or other suitably configured parts to each other. The invention also relates to a method of fastening at least two panels, flanges, sheets of material or other suitably configured parts to each other.

BACKGROUND OF THE INVENTION

It is often necessary or desirable to secure two panels to each other. The panels may, for instance be solid, rigid elements which are to be fastened or joined to each other at relatively flat zones thereof.

A wide range of fasteners can be used to join such panels. Nuts and bolts are one of the most common fasteners employed for this purpose. Clips, clamps, studs with nuts, screws and various other devices and articles are well known and commonly used to fasten or join such panels or other parts together.

The Applicant manufactures canopies, or load bin covers, for vehicles. For the purposes of interpreting this specification, the term "canopy" or "vehicle canopy" refers to a cover for a load bin of a vehicle such as a "bakkie", as they are generally known in South Africa, or a utility vehicle or pick-up truck, as they are generally known in the United States of America and other parts of the world.

In many commercial embodiments of the Applicant's canopies, the canopy is modular and made up of rear, top, side and front panels which are configured to be fastened to each other. The assembled canopy is then fastened to a load bin of the vehicle. An advantage of this configuration is that the panels are specifically shaped, dimensioned and configured to be flat packed and assembled and they can be distributed as a complete knock-down (CKD) kit.

In the past, the Applicant used studs and nuts as fasteners for joining the panels. It was found that as many as forty eight (48) studs with nuts were required to assemble each canopy, which thus resulted in 48 fastening points in each canopy. This fastening technique was relatively expensive and made assembly of the canopies technical, complex and/or time-consuming.

Figure 1:
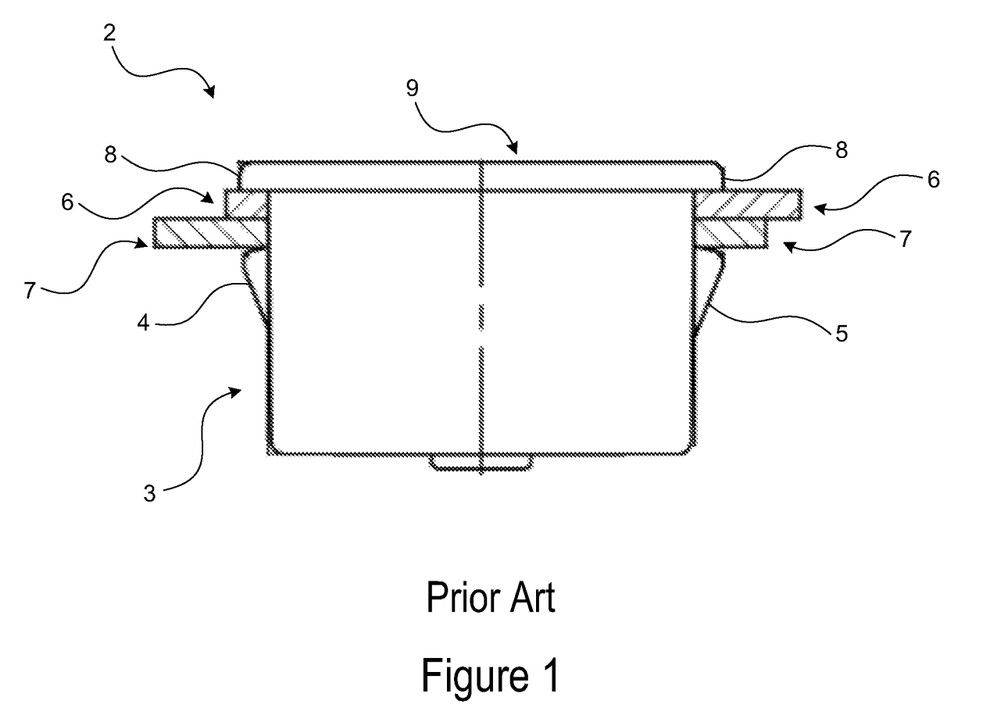
FIG. 1 is a side view of a prior art fastener, wherein the fastener is positioned so as to join two panels to each other, the panels being shown in cross-section.

The Applicant then started to use Dirak™ fasteners as an alternative. An example of such a Dirak™ fastener (2) is shown in FIG. 1. The fastener (2) comprises a body (3) with two retractable wings (4, 5). The wings (4, 5) are mechanically actuatable and can move radially or laterally outwardly to enable the fastening of two panels (6, 7) to each other. With the wings (4, 5) stowed inside or close to the body (3), the fastener (2) is locatable partially through aligned slots in the panels (6, 7) to be joined. The wings (4, 5) may be actuated by a spring-loaded key or actuator provided at an end region of the body (3). When actuated, the wings (4, 5) are displaced outwardly relative to the body (3) to clamp the two panels (6, 7) between the wings (4, 5) and a lip (8) defined at a base (9) of the body (3), as shown in FIG. 1. Fasteners of the type described above are, however, relatively expensive and complex in configuration, making it undesirable for the Applicant to use them.

In light of the above, a need was identified for an improved fastening device that is cheaper to manufacture, easier to use and/or more reliable than those known in the art. Furthermore, the Applicant identified a need for a fastening device that can reduce the number of fastening points required when assembling the Applicant's canopies.

Embodiments of the present invention aim to overcome or alleviate some of the problems and drawbacks associated with the above prior art, at least to some extent.

SUMMARY OF THE INVENTION

According to an aspect of the invention, there is provided a fastening device for fastening at least two panels or flanges to each other, the fastening device comprising:

a male member which includes a base and a projection, the projection being shaped and dimensioned to be inserted into and at least partially through aligned slots in the at least two panels or flanges, and the base being configured to limit the movement of the projection through the slots, wherein the male member further includes or houses a first securing component;

a female member which defines an opening, the opening being shaped and dimensioned generally complementally to the projection of the male member, wherein the male member and the female member are configured to receive the at least two panels or flanges between them when the projection is received in the opening, in use;

a washer which is configured to mate with the female member, wherein the washer is shaped and dimensioned such that in use, when mating with the female member, displacement of the washer relative to the female member towards the male member is substantially prevented; and a second securing component which is configured to mate with the first securing component and to secure the washer against the female member, thereby clamping the at least two panels or flanges between the female member and the male member.

The projection may be connected to and extend from the base. The base may be longer and/or wider than the projection and the aligned slots, thereby limiting movement of the projection through the slots. The base may define a base lip which acts as a stopper preventing further movement of the male member through the slots. In other words, the male member may be shaped and dimensioned such that the projection fits through the aligned slots, while the base does not.

When the male member and female member are engaged, a space may be defined between a rear surface of the female member and the base lip of the male member, wherein edge regions of the panels or flanges adjacent to the aligned slots are locatable within this space. The space may thus essentially be a clamping zone.

The male member may be configured such that, when the at least two panels or flanges are received between the male member and the female member, one of the panels or flanges abuts the base lip of the male member. The female member may be configured such that, when the at least two panels or flanges are received between the male member and the female member, one of the panels or flanges abuts a rear surface of the female member.

The washer may be longer and/or wider than the opening of the female member. The female member may include a raised circumferential formation on the front surface thereof defining a seat to receive the washer therein and against the front surface of the female member. The raised formation restricts lateral movement of the washer relative to the front surface of the female member. When located on the front surface of the female member, an outer or free edge of the raised formation may be flush with a corresponding surface of the washer.

The second securing component may be configured to secure the washer against the female member and against the male member, e.g. in abutment with a front surface of the female member and in abutment with a front surface of the projection of the male member.

The first securing component may be an internally threaded part of or housed in the male member and the second securing component may be an externally threaded part, such as a fastening bolt.

The washer may include an aperture for receiving a shank of the fastening bolt. The male member may also include an aperture for receiving the shank of the fastening bolt therein. The apertures may be shaped and dimensioned such that only the shank and not a head of the fastening bolts fits through the apertures. The aperture of the male member exposes the first securing component, in some embodiments being the threaded insert.

The internally threaded component may be a threaded insert. The thread of the insert may be treated with nylon drip feed during manufacturing such that a nyloc fitting is created and an interference fit results when the bolt is inserted.

The threaded insert may be manufactured so as to be held captive inside of the male member, e.g. by way of injection moulding.

The threaded insert may be or may include at least one nut. In some embodiments, the threaded insert includes two co-axial nuts configured to receive the bolt.

In some embodiments, the panels or flanges may thus operatively be clamped between the base lip of the male member and a rear edge adjacent to the opening of the female member, with the washer secured in abutment with a front surface of the female member and in abutment with the projection of the male member as a result of securing the bolt into the threaded insert of the male member via the apertures in the washer and the male member.

A further spring-loaded washer may be located between the bolt head and the washer.

The device may be substantially rectangular cuboidal in shape. The female member, male member and washer may be generally rectangular when viewed from the front or the rear, and the slots may also be substantially rectangular. The slots may conform substantially to the cross-sectional shape of the projection.

Foam, rubber or foamed rubber may be located between the two panels or flanges, in use. The foam, rubber or foamed rubber may be in the form of one or more strips around the slots of the panels or flanges. The foam may be compressed when fastening the panels or flanges together.

In some embodiments, the fastening device may be used to join modular panels of a vehicle canopy. Side panels, a rear panel, a front panel and/or a top panel of a modular canopy may each include a plurality of slots that are able to be aligned with a plurality of slots configured on an adjacent panel to which each panel is to be joined.

In accordance with a second aspect of the invention, there is provided a modular canopy for a vehicle, the canopy comprising a plurality of panels, wherein adjacent panels are fastened together using at least one fastening device as described above.

A plurality of the fastening devices may thus be used for fastening two panels to each other, a first panel of the two panels including a plurality of slots that are able to be aligned with a plurality of slots configured on a second panel, and each pair of slots being configured to receive one of the fastening devices.

In accordance with a third aspect of the invention, there is provided a method of fastening at least two panels or flanges to each other, the method comprising:

positioning or locating the at least two panels or flanges such that slots in the panels or flanges are aligned;

inserting a projection of a male member of a fastening device into and at least partially through the aligned slots, wherein the male member includes a base which is configured to limit the movement of the projection through the slots;

positioning or locating a female member of the fastening device such that the projection of the male member is received in an opening of the female member, the opening being shaped and dimensioned generally complementally to the projection, thereby causing the at least two panels or flanges to be received between the male member and the female member;

positioning or locating a washer such that it mates with the female member, wherein the washer is shaped and dimensioned such that displacement of the washer relative to the female member and towards the male member is substantially prevented; and securing the washer against the female member using a second securing component, wherein the second securing component mates with a first securing component which forms part of or is housed in the male member, thereby clamping the at least two panels or flanges between the female member and the male member.

The method may include securing the washer against the female member and against the male member using the second securing component.

The method may include locating foam, rubber or foamed rubber between the at least two panels or flanges before fastening them to each other.

BRIEF DESCRIPTION OF THE DRAWINGS

The invention shall now be explained by way of reference to the following non-limiting drawings, in which.

DETAILED DESCRIPTION WITH REFERENCE TO THE DRAWINGS

The following description of the invention is provided as an enabling teaching of the invention, is illustrative of the principles of the invention and is not intended to limit the scope of the invention. It will be understood that changes can be made to the embodiment described, while still attaining beneficial results of the present invention. Furthermore, it will be understood that some benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention.

An embodiment of a fastening device (10) according to the invention is illustrated in FIGS. 2 to 9.

The fastening device (10) is configured for fastening two panels (100, 200 in FIGS. 8 and 9) to each other. In particular, but not exclusively, the fastening device (10) is configured for joining two vehicle canopy panels, as will be explained in more detail below.

Figure 2:
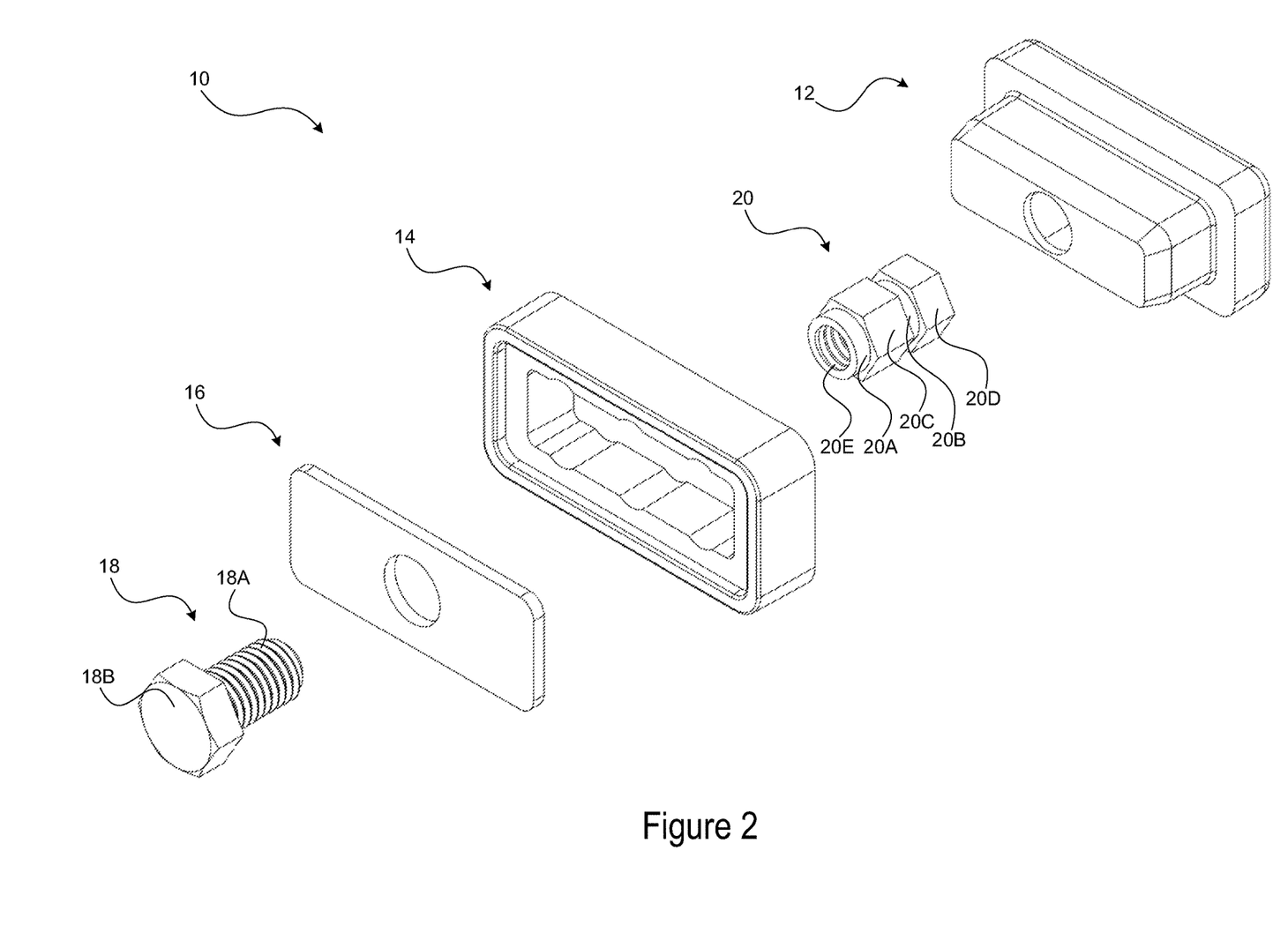
FIG. 2 is an exploded perspective view of an embodiment of a fastening device according to the invention.

The fastening device (10) comprises a male member (12) with a threaded insert (20), a female member (14), a washer plate or washer (16) and a fastening bolt (18), as is best shown in FIG. 2. The insert (20) serves as a first securing component while the bolt (18) serves as a second securing component of the fastening device (10).

Figure 3:
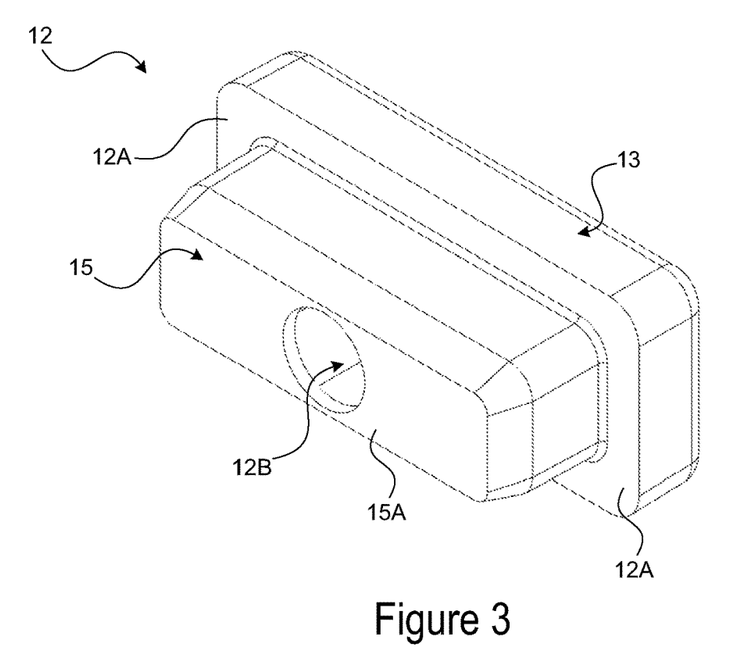
FIG. 3 is a perspective view of a male member of the fastening device of FIG. 2, wherein an insert of the male member is not shown.
Figure 8:
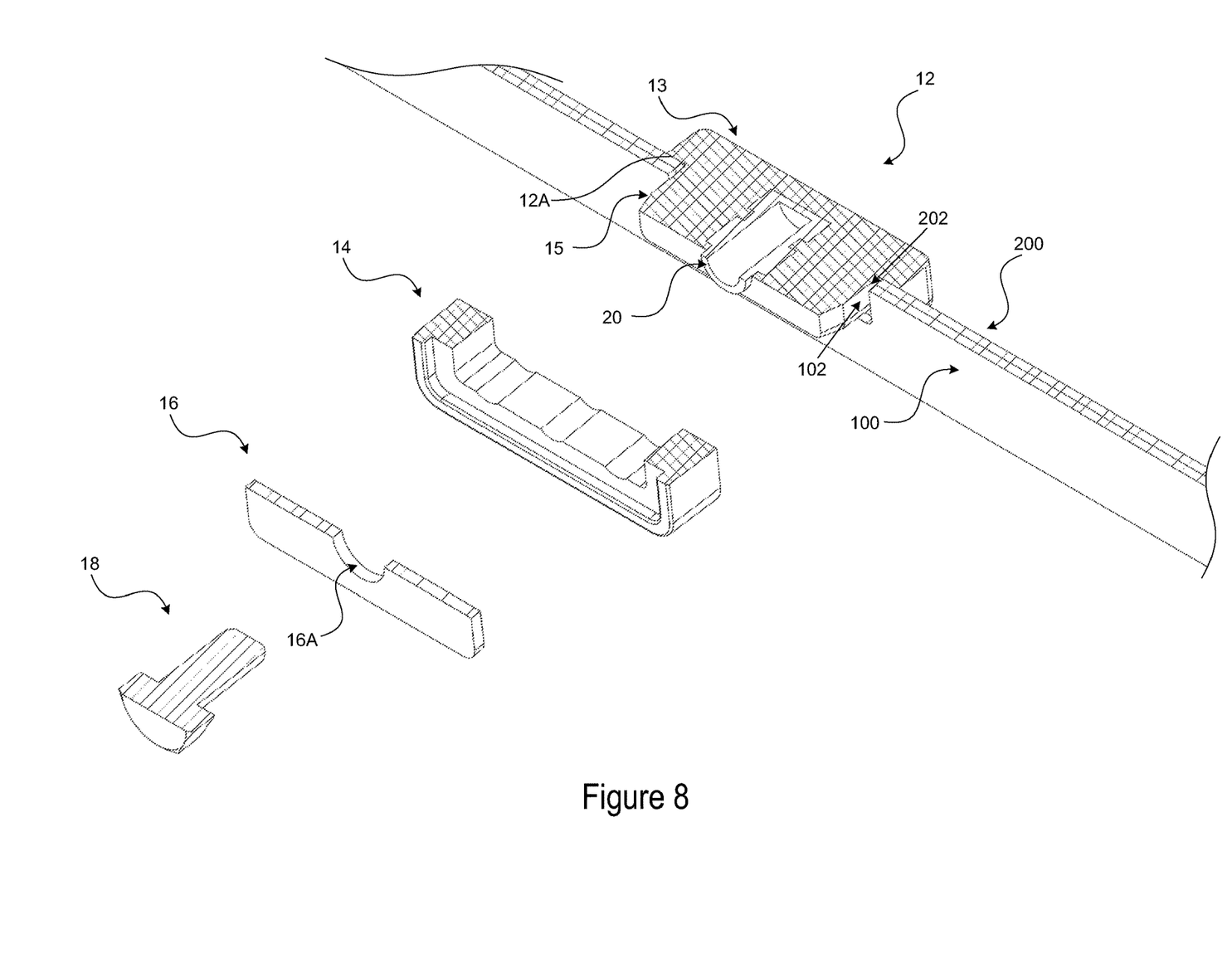
FIG. 8 is an exploded cross-sectional perspective view of the fastening device of FIG. 2 and two panels to be fastened together.
Figure 9:
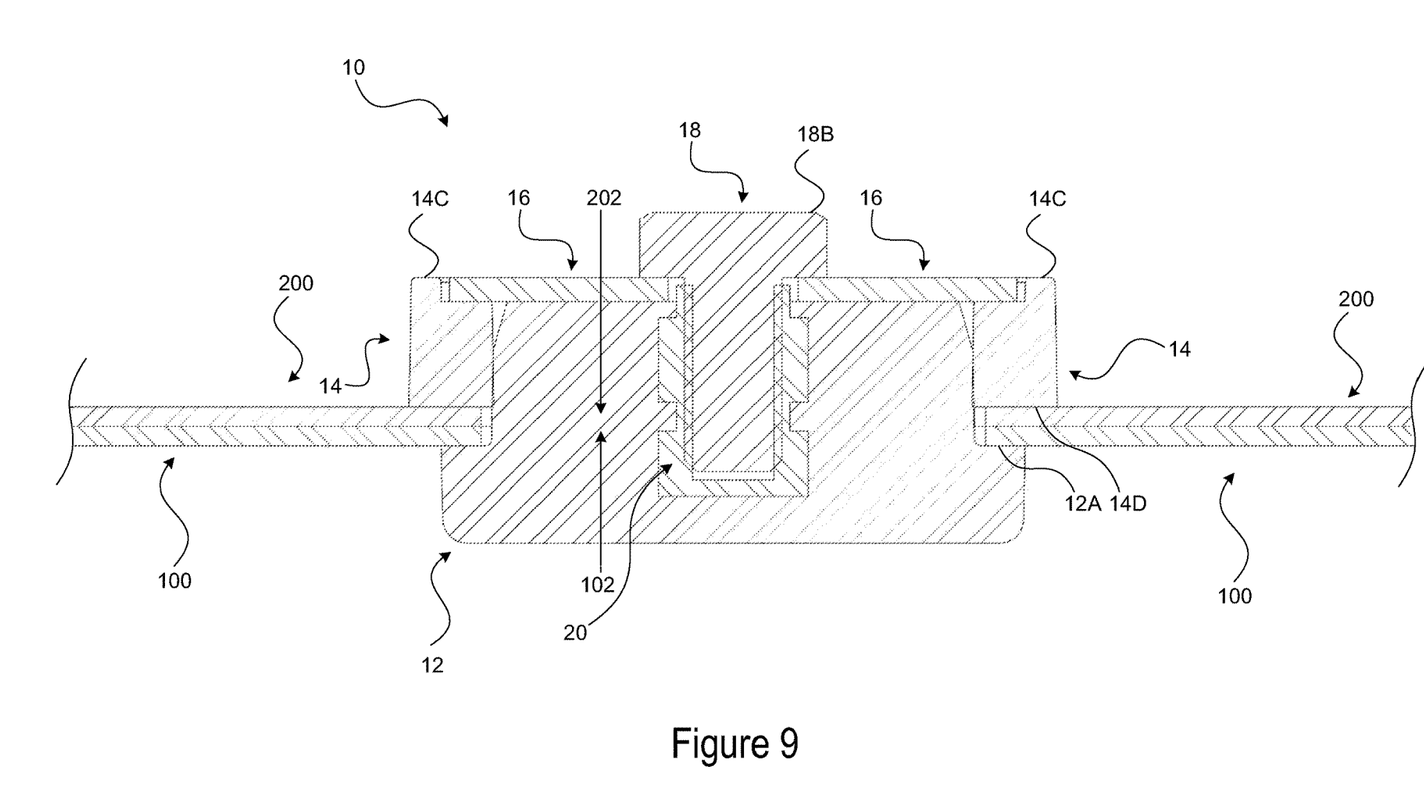
FIG. 9 is a cross-sectional view of the fastening device of FIG. 2 in the assembled or fastened condition, wherein the two panels of FIG. 8 are fastened together by the fastening device.

Referring to FIG. 3, the male member (12) has a base (13) and a projection (15) protruding from the base (13). The projection (15) is connected to the base (13) and extends from the base (13) towards an operative front of the male member (12). The base (13) is generally rectangular cuboidal, with rounded corner regions, and is longer and wider than the projection (15), thereby defining a flat base lip (12A) around the periphery of the projection (15). This allows the projection (15) to be inserted through aligned slots (102, 202) on the two panels (100, 200), as shown in FIGS. 8 and 9, while the base (13) does not fit through the slots (102, 202) and thus limits or restricts movement of the male member (12) once the projection (15) has been moved through the aligned slots (102, 202) in use. In other words, the base (13) and particularly the base lip (12A) acts as a stopper preventing further movement of the male member (12) through the slots (102, 202). The base (13) also clamps the panels (100, 200) together and against the female member (14), in use.

Figure 7:
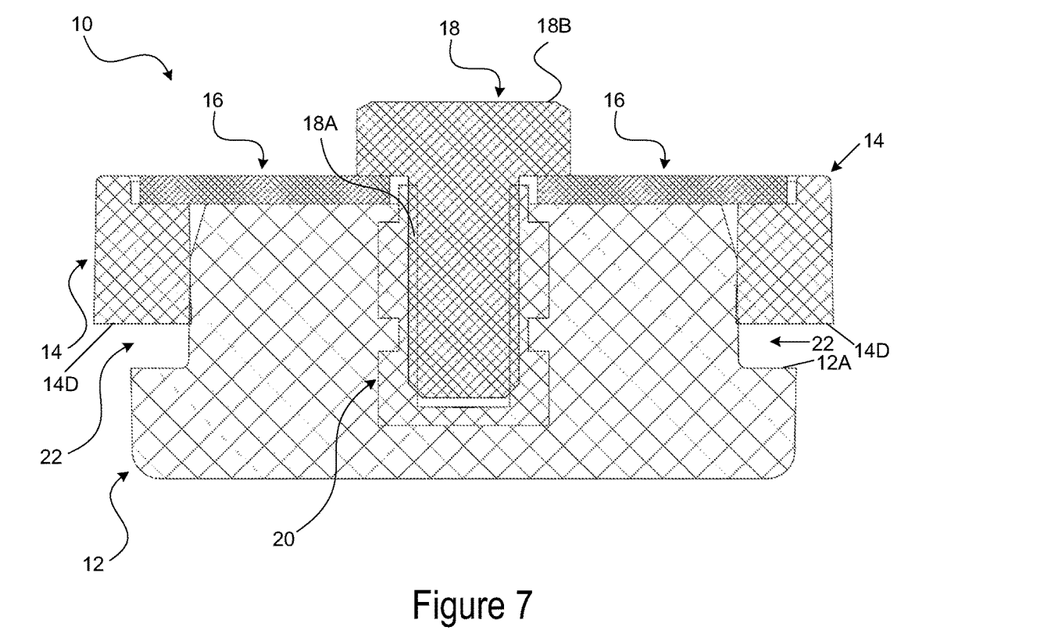
FIG. 7 is a cross-sectional view, taken along the line A-A in FIG. 6.

The male member (12) has an internal cavity in which it houses the insert (20) (see FIGS. 7 and 9). As shown in FIG. 2, the insert (20) comprises two cylindrical portions (20A, 20B) and two co-axial nuts (20C, 20D) which are spaced apart by one of the cylindrical portions (20B). The internal cavity is specifically shaped and dimensioned to accommodate the insert (20). It will be apparent from FIGS. 7 and 9 that the insert (20) is held captive in the male member (12) (it is thus shown in FIG. 2 merely to illustrate its features more clearly). The insert (20) has an internally threaded (20E) cylindrical hole for mating with the bolt (18).

The insert (20) is a solid, integrally formed component, meaning that the nuts (20C, 20D) and cylindrical portions (20A, 20B) are not relatively displaceable. Typically, the insert (20) may be manufactured inside of the male member (12) by means of injection moulding.

Figure 4:
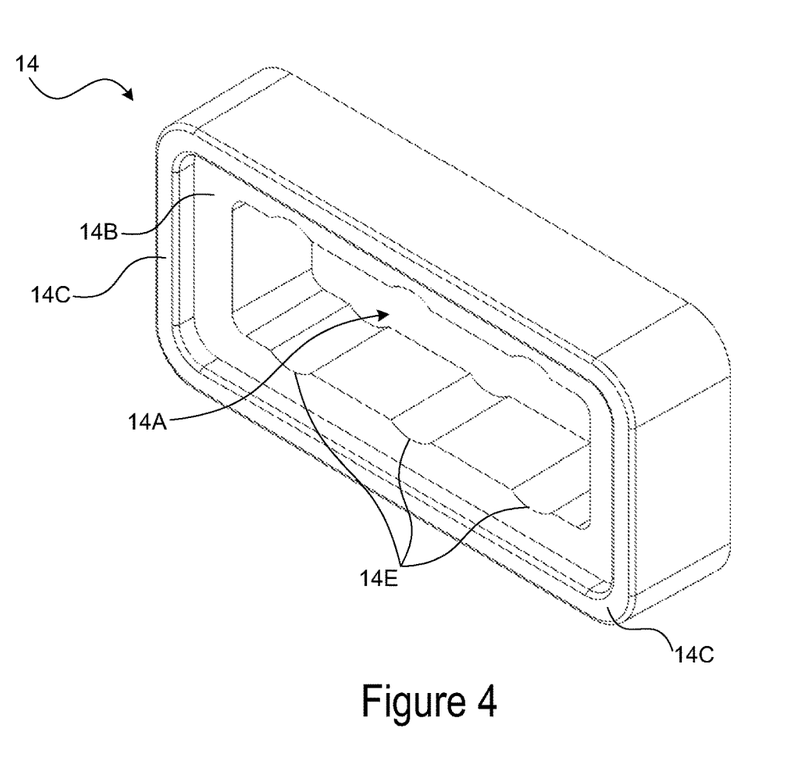
FIG. 4 is a perspective view of a female member of the fastening device of FIG. 2.

Referring to FIG. 4, the female member (14) of the fastening device (10) is substantially rectangular cuboidal, with rounded corner regions, and a central opening (14A) for receiving the projection (15) of the male member (12). The opening (14A) is shaped and dimensioned generally complementally to the projection (15) so as to receive the projection (15), preferably in a friction fit.

When the male member (12) and female member (14) are engaged, a space (22) is defined between a rear surface or rear edge (14D) of the female member (14) and the base lip (12A) of the male member. The space (22) provides a clamping zone for receiving parts of the panels (100, 200) to be clamped. This is best shown in FIG. 7.

The female member (14) has a raised circumferential formation (14C) at a front thereof, as shown in FIG. 4. The raised circumferential formation (14C) extends around and projects forwardly relative to a front surface (14B) adjacent to the opening (14A). The formation (14C) defines a seat to receive the washer (16) against the front surface (14B).

Figure 5:
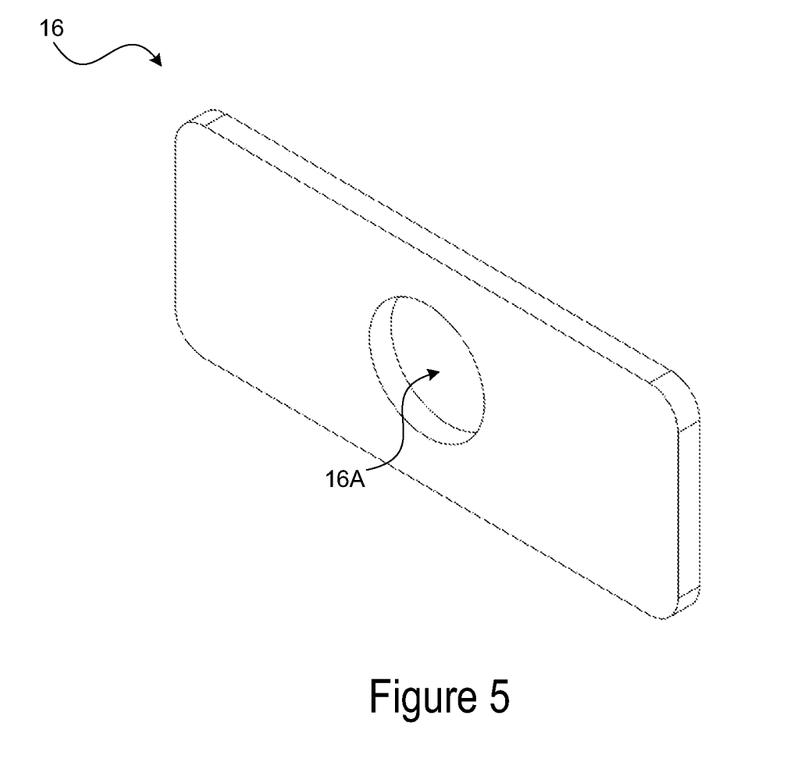
FIG. 5 is a perspective view of a washer of the fastening device of FIG. 2.
Figure 6:
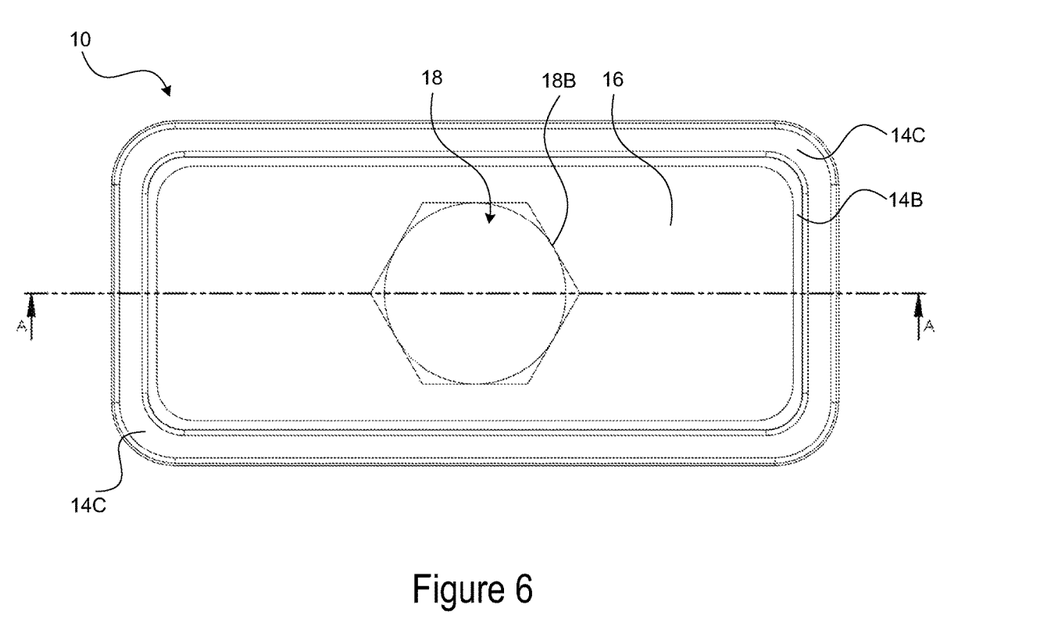
FIG. 6 is a front view of the fastening device of FIG. 2 in an assembled or fastened condition.

Turning to FIG. 5, the washer (16) is shaped and dimensioned such that during assembly, the inward movement of the washer (16) relative to the female member (14), i.e. movement of the washer in the direction of the male member (12) is restricted, and the washer (16) is securable to the female member (14) and male member (12) using the fastening bolt (18), as shown in FIGS. 6 to 9.

To achieve this assembly, the washer (16) is manufactured so as to be longer and wider than the opening (14A), while being shaped and dimensioned to fit into the seat defined by the raised circumferential formation (14C) of the female member (14), adjacent to the front surface (14B). The washer (16) can thus be positioned so as to abut the front surface (14B) of the female member (14) about the opening (14A). The washer (16) is configured to mate with the female member (14C) as shown in FIGS. 7 and 9 such that displacement of the washer (16) relative to the female member (14) and towards the male member (12) is substantially prevented.

As a result of the arrangement of the washer (16), the two panels (100, 200) can be fastened or clamped between the female member (14) and the male member (12), as shown in FIG. 9.

Referring now to FIGS. 8 and 9, the panels (100, 200) include slots (102, 202) which can be aligned with each other to define an opening. The slots (102, 202) receive the male member (12) of the device (10), i.e. the projection (15) of the male member (12) is inserted through the opening defined by the slots (102, 202).

Referring to FIGS. 3 and 5, the washer (16) includes a circular aperture (16A) for receiving the shank of the fastening bolt (18) there through. The male member (12), and more specifically the projection (15) thereof, also includes an aperture (12B) for receiving the bolt (18) therein. The aperture (12B) exposes the internal cavity such that the bolt (18) can mate with the insert (20). It will be appreciated and is clear from the drawings that the apertures (16A, 12B) are sized such that only the shank of the bolt (18) and not the head (18B) can fit through the apertures (16A, 12B).

The male member (12) is configured to receive and secure a part of the bolt (18) therein, and the male member (12) includes the internally threaded insert (20) which is adapted to receive and secure a complementally externally threaded zone of the bolt (18).

The washer (16) is secured in abutment with the front surface (14B) of the female member (14) by fastening the bolt (18) into and against the male member (12) through the apertures (16A, 12B).

The panels (100, 200) are clamped between the base lip (12A) of the male member (12) and a rear edge (14D) of the female member (14) (see FIG. 9).

The bolt (18) thus mates with the insert (20) by means of threaded engagement between the external screw thread (18A) of the bolt (18) and the internal screw thread (20E) of the insert (20). The head (18B) of the bolt (18) secures the washer (16) against the female member (14) and against a front surface (15A) of the projection (15) of the male member (12), fastening or securing the panels (100, 200) tightly between the members (12, 14).

In use, the panels (100, 200) are positioned such that the slots (102, 202) are in alignment. Preferably, the aligned slots create an opening that conforms to the cross-sectional shape of the projection (15). Then, the projection (15) is inserted through the slots (102, 202) until the base lip (12A) abuts one of the panels (100). The base (12) limits further movement through the slots (102, 202). Then, the female member (14) is placed over the projection (15) such that the projection (15) is received in the opening (14A) of the female member (14) and the rear edge (14D) of the female member (14) abuts the other panel (200). In this way, the panels (100, 200) are received in the space (22) or clamping zone between the members (12, 14).

At a next stage, the washer (16) is located such that it mates with the female member (14), i.e. it is positioned in the seat defined by the circumferential formation (14C). Then, the bolt (18) is inserted into the apertures (16A, 12B) and screwed into the insert (20), thus securing or urging the washer (16) against the female member (14) and tightening the members (12, 14) against each other. This clamps the panels (100, 200) tightly together.

Referring again to FIG. 4, inner surfaces of the female member (14) which define the opening (14A) may include grooves (14E). Although not shown in the drawings, the projection of the male member (12) may be provided with correspondingly shaped ridges or protrusions configured to mate with the grooves (14E) when the projection (15) is inserted into the opening (14A). This may facilitate or improve the fit between the male and female members.

Alternatively, the female member (14) may be devoid of the grooves (14E) and simply have a smooth internal surface corresponding to the external shape of the projection (15), with the projection (15) being devoid of ridges as it is shown in FIG. 3, such that the projection (15) fits snugly into the opening (14A).

The device (10) is, in this example, substantially rectangular in shape when viewed from the front or the rear. The female member (14), male member (12) and washer (16) are generally rectangular, and the slots (102, 202) are substantially rectangular too. The Inventor has found that the use of a rectangular shape creates a larger surface area over which the device (10) is able to clamp, this reducing the number of fastening points which may be required to join two or more panels or other objects together. This may make it quicker and easier to assemble panels, e.g. in a modular vehicle canopy, and may reduce overall cost.

In other embodiments, the device may have any other suitable shape, such as circular, square or otherwise. The general shape of the female member may be the same as or may vary from the general shape of the male member, provided the opening and the projection are shaped and dimensioned to engage each other in a suitable fit. For example, the male member may be generally rectangular with a cylindrical zone which engages with a cylindrical opening configured in a generally rectangular female member, or a cylindrical opening configured in a generally cylindrical female member.

Foam (not shown) may be located between the two panels (100, 200) before securing them to each other. When foam is located between the panels (100, 200), the foam is compressed between the panels (100, 200) when fastening the panels together using the device (10). The Inventor has found that this may reduce friction between adjacent panels (100, 200), while the foam may also serve a shock absorbing function.

The Inventor believes that embodiments of the invention, such as the one described with reference to FIGS. 2 to 9, may provide numerous advantages in addition to those already mentioned above. The fastening device may relatively cheap to manufacture and simple to use. Furthermore, the robust design may provide enhanced reliability and may provide an effective seal, preventing significant leaking of fluid from one side of the panels to another side of the panels.

As mentioned above, the fastening device (10) may be used to join modular panels of a vehicle canopy. Side panels, rear and front panels and a top panel of a modular canopy may each include a plurality of slots that are able to be aligned with a plurality of slots configured on an adjacent panel to which each panel is to be joined. For example, the rear panel may include slots configured along the side joining edges or zones thereof, which align with slots configured on the rear joining edge or zone of each side panel of the canopy. The rear panel may also include slots configured along the top joining edge or zone thereof, which align with slots configured on the rear joining edge or zone of the top panel of the canopy. A plurality of the fastening devices (10) as described above can be employed to join the panels together to assemble the canopy.

The invention has been described mainly with reference to the attachment of vehicle canopy panels to each other. However, it will be understood that the fastening device as described herein may be used to fasten or join two or more panels, flanges, sheets, or the like, of any suitable type and configuration to each other, without departing from the scope of the invention. For example, two flat or suitably shaped sheets of rigid material may be joined using the device (10).

The invention claimed is:

1. A fastening device for fastening at least two panels or flanges to each other, the fastening device comprising:
   a male member which includes a base and a projection, the projection being shaped and dimensioned to be inserted into and at least partially through aligned slots in the at least two panels or flanges, and the base being configured to limit the movement of the projection through the slots, wherein the male member further includes or houses a first securing component;
   a female member which defines an opening, the opening being shaped and dimensioned generally complementally to the projection of the male member, wherein the male member and the female member are configured to receive the at least two panels or flanges between them when the projection is received in the opening, in use;
   a washer which is configured to mate with the female member, wherein the washer is shaped and dimensioned such that in use, when mating with the female member, displacement of the washer relative to the female member towards the male member is substantially prevented; and
   a second securing component which is configured to mate with the first securing component and to secure the washer in abutment with the female member and in abutment with the projection of the male member, thereby clamping the at least two panels or flanges between the female member and the male member.

2. The fastening device according to claim 1, wherein the base defines a base lip around a periphery of the projection, the base lip acting as a stopper preventing further movement of the male member through the slots.

3. The fastening device according to claim 2, wherein a clamping zone is defined between a rear surface or rear edge of the female member and the base lip of the male member when the male member and female member are engaged.

4. The fastening device according to claim 1, wherein the female member includes a raised circumferential formation on a front surface thereof, defining a seat for receiving the washer.

5. The fastening device according to claim 1, wherein the first securing component is an internally threaded part of the male member or an internally threaded part housed in the male member, and wherein the second securing component is an externally threaded part.

6. The fastening device according to claim 5, wherein the first securing component is a threaded insert which is held captive inside of the male member.

7. The fastening device according to claim 6, wherein the threaded insert includes at least one nut.

8. The fastening device according to claim 5, wherein the second securing component is a fastening bolt.

9. The fastening device according to claim 8, wherein the washer includes an aperture for receiving a shank of the fastening bolt, wherein the male member also includes an aperture for receiving the shank of the fastening bolt, the aperture of the male member exposing the first securing component, and wherein the apertures are shaped and dimensioned such that only the shank and not a head of the fastening bolt fits through the apertures.

10. The fastening device according to claim 9, wherein the panels or flanges are operatively clamped between the male member and a rear edge or rear surface adjacent to the opening of the female member, with the washer secured in abutment with a front surface of the female member and in abutment with the projection of the male member as a result of securing the fastening bolt into the first securing component via the apertures in the washer and the male member.

11. The fastening device according to claim 1, wherein the female member, the male member and the washer are generally rectangular when viewed from the front or the rear.

12. The fastening device according to claim 1, wherein the slots are generally rectangular and conform substantially to the cross-sectional shape of the projection.

13. The fastening device according to claim 1, wherein the fastening device is configured for joining modular panels of a vehicle canopy.

14. A modular canopy for a vehicle, the canopy comprising a plurality of panels, wherein adjacent panels are fastened together using at least one fastening device according to claim 1.

15. The canopy according to claim 14, wherein side panels, a rear panel, a front panel and/or a top panel of the canopy each includes a plurality of slots that are able to be aligned with a plurality of slots configured on an adjacent panel to which each panel is to be joined.

* * * * *